United States Patent Office 2,830,042
Patented Apr. 8, 1958

2,830,042
MONOAZO DYESTUFFS

Gerhard Dittmar, Leverkusen-Schlebusch, and Rolf Pütter, Dusseldorf, Germany, assignors to Farbenfabriken Bayer Aktiengesellschaft, Leverkusen, Germany, a corporation of Germany No Drawing. Application December 28, 1955
Serial No. 555,764

Claims priority, application Germany January 18, 1955

9 Claims. (Cl. 260—146)

The present invention relates to new monoazo dyestuffs, their heavy metal complexes and to a process for their manufacture; more particularly it relates to monoazo dyestuffs corresponding to the following formula

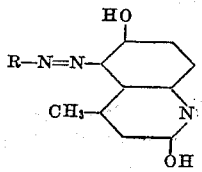

wherein R stands for a radical of the benzene series carrying o-position to the azo bridge a group capable of forming a complex salt and the heavy metal complex compounds of said azo dyestuffs.

It is an object of the present invention to provide new monoazo dyestuffs and their metal complex compounds. It is a further object to provide new metal containing monoazo dyestuffs with good fastness properties.

In accordance with the invention it has been found that new metallizable monoazo dyestuffs are obtained by coupling 2,6-dihydroxy-4-methyl-quinoline with diazo compounds of the benzene series which carry in o-position to the diazo group a group capable of forming a complex salt and which may be further substituted.

The diazo compounds, which carry in o-position to the diazo group a group capable of forming a heavy metal complex salt may be substituted by radicals such as —SO₃H, —COOH, —SO₂ (or —CO—)—NH₂
—SO₂(or —CO—)—NH-alkyl
—SO₂(or —CO—)—N(alkyl)₂, —SO₂-alkyl
—SO₂-aralkyl, —SO₂-aryl, -alkyl, —NO₂
-halogene, o-alkyl and —SO₂—CH₂—O—

(being attached to the benzene nucleus in 3,4-position to the group capable of forming a metal complex salt).

The coupling of the 2,6-dihydroxy-4-methylquinoline takes place in o-position, in 5-position, to the carbocyclically bound hydroxy group:

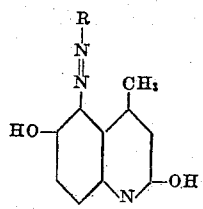

The 2,6-dihydroxy-4-methylquinoline used as coupling component in the preparation of the new dyestuffs is obtained in usual manner by the process described in Journal Am. Chem. Soc., vol. 76, page 2404, or directly from 4-acetoacetylaminophenol by cyclisation with acid condensation agents such as for example sulfuric acid, phosphorus oxychloride or tin chloride. The dyestuffs thus obtained can be converted into their metal complexes in substance or on the fibre.

The conversion of the metal-free dyestuffs into the metal-containing dyestuffs in substance can be carried out by methods known from literature. The chromium and cobalt complex compounds are of particular technical interest. They are likewise suitable for the dyeing of wool and polyamide fibres. If the dyestuffs are free from anionic water-solubilizing groups their metal complexes dye wool or polyamide fibres also from a neutral or weakly acid bath.

The new dyestuffs yield in the single-bath or after-chroming process on animal and polyamide fibres greyish blue, brown or olive shades.

The metal complexes of the new dyestuffs yield on wool grey, brown or olive shades of excellent fastness to light and good fastness to wet processing.

The following examples are given for the purpose of illustrating the invention. The parts being by weight:

Example 1

23.4 parts of 1-amino-2-hydroxy-5-nitrobenzene-3-sulfonic acid are stirred with 200 parts of water and 15 parts of concentrated hydrochloric acid and diazotized with 37 parts of a 20 percent sodium nitrite solution. The diazo compound thus obtained is run at 0° C. into a solution of 18 parts of 2,6-dihydroxy-4-methylquinoline, 30 parts of pyridine, 35 parts of a 30 percent caustic soda solution and 70 parts of water. After the coupling is completed, the solution is salted out with common salt. The isolated dyestuff corresponding to the formula

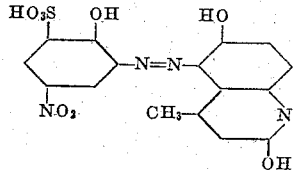

dyes wool after-chromed in brown shades very fast to light.

Example 2

15.4 parts of 1-amino-2-hydroxy-5-nitrobenzene are dissolved in 150 parts of water and 25 parts of concentrated hydrochloric acid, and diazotized with 35 parts of a 20 percent sodium nitrite solution. The diazo compound thus obtained is added at 0° C. to a solution of 18 parts of 2,6-dihydroxy-4-methylquinoline, 30 parts of a 30 percent caustic soda solution, 20 parts of soda and 100 parts of water. After the coupling is complete, the azo dyestuff thus formed is isolated. It dyes wool and polyamide fibres in the single-bath chroming process in black-brown shades having excellent fastness to light

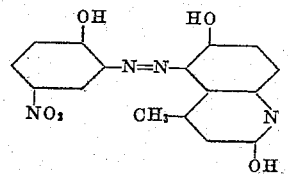

Example 3

35 parts of the dyestuff prepared according to Example 2 are heated to the boil with 1500 parts of water and 20 parts of caustic soda solution. Into this solution there is run within one hour a freshly prepared mixture of a solution of 6 parts of potassium bichromate in 100 parts of water and of a solution of 9 parts of glucose in 50 parts of water. The dyestuff chromium complex thus formed is isolated in usual manner. It dyes wool from a neutral or weakly acid bath in fast black-brown shades whose excellent fastness to light is particularly worth mentioning,

Example 4

In a similar manner to the process described in Example 2 the monoazo dyestuff is prepared from 1-amino-2-hydroxy-4-nitrobenzene and 2,6-dihydroxy-4-methylquinoline. It can be converted into its cobalt complex in the following way: 35 parts of the dyestuff are heated with 1500 parts of water to 90° C. Into this mixture there is run within one hour a solution of 15 parts of crystalline cobaltous sulfate, 250 parts of water and 100 parts of 25 percent ammonia, after having been oxidized said solution by addition of 3 millilitres of 30 percent hydrogen peroxide to the trivalent cobalt complex solution. The cobalt complex of the dyestuff having the formula

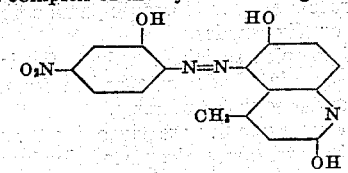

thus formed is isolated by addition of a little common salt. It dyes from a neutral to weakly acid bath in fast greyish blue shades.

Example 5

20 parts of 1-amino-2-hydroxybenzene-5-ethylsulfone are dissolved in 250 parts of water and 25 parts of concentrated hydrochloric acid and diazotized with 35 parts of a 20 percent sodium nitrite solution at 0–5° C. The diazo compound is run into a solution of 18 parts of 2,6-dihydroxy-4-methylquinoline, 30 parts of pyridine and 35 parts of a 30 percent caustic soda solution in 70 parts of water. After the coupling is completed, the dyestuff thus formed corresponding to the formula

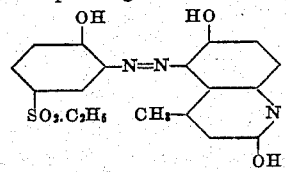

is isolated and converted into the chromium complex according to the method disclosed in Example 3. It yields from a neutral to weakly acid bath dyeings on wool which are slightly more yellow than those obtained with the chromium complex of Example 3.

The cobalt complex of this dyestuff is obtained according to the cobalting method described in Example 4. It dyes wool in red-brown shades of good fastness properties, particularly of good fastness to light.

If in this example the 1-amino-2-hydroxybenzene-5-ethylsulfone is replaced by 1-amino-2-hydroxybenzene-5-sulfonamide or its derivatives alkylated on the amide nitrogen but maintaining otherwise the same working conditions, chromium or cobalt complexes are obtained having similar properties.

Example 6

22 parts of 1-amino-2-hydroxybenzene-4-sulfodimethylamide are dissolved in 250 parts by weight of water and 25 parts of concentrated hydrochloric acid, and diazotized with 35 parts of a 22 percent sodium nitrite solution at 0–5° C. The diazo compound is run into a solution of 18 parts of 2,6-dihydroxy-4-methylquinoline in 200 parts of water and 40 parts of a 30 percent caustic soda solution. After the coupling is complete, the solution is heated to 60° C., neutralized with hydrochloric acid until weakly alkaline to phenolphthalein and the dyestuff of the following formula

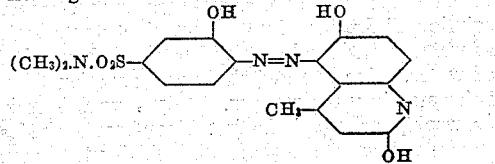

is isolated.

The chromium complex of the dyestuff obtained by the chroming process described in Example 3 and the cobalt complex obtained by the cobalt treatment according to Example 4 dye wool from a neutral to weakly acid bath in current shades of very good fastness properties.

Example 7

20 parts of 1-amino-2-hydroxy-3,5-dinitrobenzene are stirred overnight with 150 parts of water and 14 parts of a 30 percent caustic soda solution. On the following morning, the mixture is treated with 35 parts of hydrochloric acid and diazotized with 30 parts of a 30 percent sodium nitrite solution at 25–28° C. The diazo compound is added to a solution of 18 parts of 2,6-dihydroxy-4-methylquinoline, 30 parts of pyridine, 35 parts of a 30 percent caustic soda solution and 70 parts of water. The azo dyestuff thus formed is isolated when the coupling is completed. It corresponds to the formula

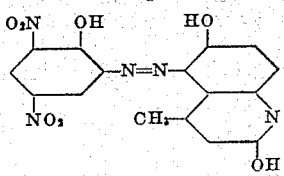

and dyes wool in the single-bath chroming process in fast olive shades which excel particularly in an outstanding fastness to light.

Example 8

22 parts of 1-amino-2-carboxybenzene-5-sulfonic acid are dissolved in 150 parts of water and 20 parts of hydrochloric acid, and diazotized with 35 parts of a 20 percent sodium nitrite solution at 5° C. The diazo compound is run into a solution of 17.5 parts of 2,6-dihydroxy-4-methylquinoline, 150 parts of water, 15 parts of a 30 percent caustic soda solution and 25 parts by weight of soda. After the coupling is completed, the dyestuff thus formed is isolated. It corresponds to the formula

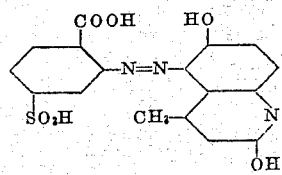

The dyestuff yields on wool after-chromed brown shades of good fastness properties.

If in this example the 1-amino-2-carboxybenzene-5-sulfonic acid is replaced by 1-amino-2-carboxybenzene-4-sulfonic acid, a dyestuff is obtained which produces on wool dyeings having similar properties.

We claim:

1. Dyestuffs selected from the group consisting of monoazo dyestuffs corresponding to the formula

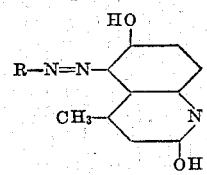

wherein R stands for a radical of the benzene series, carrying in o-position to the azo bridge a group capable of forming a metal complex salt, and the chromium and cobalt complex compounds of said azo dyestuffs.

2. A monoazo dyestuff corresponding to the formula

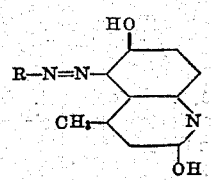

wherein R stands for a benzene radical, carrying in o-position to the azo bridge a group capable of forming a metal complex salt.

3. A chromium complex of a monoazo dyestuff of claim 2.
4. A cobalt complex of a monoazo dyestuff of claim 2.
5. The chromium complex of the following azo dyestuff

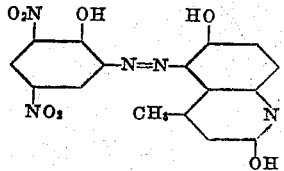

6. The chromium complex of the following azo dyestuff

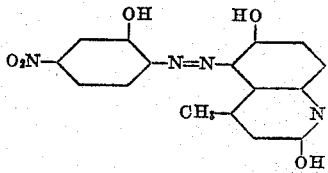

7. The chromium complex of the following azo dyestuff

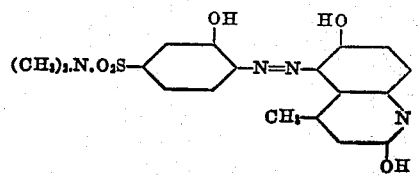

8. The cobalt complex of the following azo dyestuff

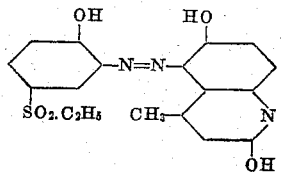

9. The monoazo dyestuff corresponding to the following formula:

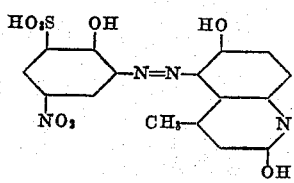

References Cited in the file of this patent
UNITED STATES PATENTS

| | | |
|---|---|---|
| 2,551,056 | Schetty | May 1, 1951 |
| 2,640,825 | Seruto | June 2, 1953 |

OTHER REFERENCES

Sahashi: Chem. Abst., vol. 26, p. 144 (1932).